(12) United States Patent
Mayer et al.

(10) Patent No.: US 10,668,314 B2
(45) Date of Patent: Jun. 2, 2020

(54) VARIABLE DISTANCE EDDY CURRENT BRAKING SYSTEM

(71) Applicant: Precor Incorporated, Woodinville, WA (US)

(72) Inventors: Brent Christopher Mayer, Edmonds, WA (US); Kevin C. Andrews, Mukilteo, WA (US)

(73) Assignee: Precor Incorporated, Woodinville, WA (US)

( * ) Notice: Subject to any disclaimer, the term of this patent is extended or adjusted under 35 U.S.C. 154(b) by 570 days.

(21) Appl. No.: 15/290,523

(22) Filed: Oct. 11, 2016

(65) Prior Publication Data

US 2017/0106222 A1    Apr. 20, 2017

Related U.S. Application Data (60) Provisional application No. 62/242,776, filed on Oct. 16, 2015.

(51) Int. Cl.
| | |
|---|---|
| *A63B 21/005* | (2006.01) |
| *F16D 63/00* | (2006.01) |
| *A63B 22/06* | (2006.01) |
| *A63B 24/00* | (2006.01) |
| *F16D 55/224* | (2006.01) |

(Continued)

(52) U.S. Cl.
CPC .... *A63B 21/0051* (2013.01); *A63B 21/00069* (2013.01); *A63B 22/0605* (2013.01); *A63B 24/0087* (2013.01); *F16D 55/2245* (2013.01); *F16D 63/002* (2013.01); *A63B 21/225* (2013.01); *F16D 2121/14* (2013.01); *F16D 2121/20* (2013.01); *F16D 2121/28* (2013.01); *F16D 2129/065* (2013.01)

(58) Field of Classification Search
CPC .... A63B 21/0051–0052; A63B 21/225; A63B 22/06–2022/0658; A63B 69/16–2069/168; F16D 55/22–228; B62L 1/14–16
See application file for complete search history.

(56) References Cited

U.S. PATENT DOCUMENTS

| | | | |
|---|---|---|---|
| 4,765,443 A * | 8/1988 | Cunningham | B62L 1/16 188/24.12 |
| 4,938,318 A * | 7/1990 | Ishibashi | B62L 1/16 188/196 M |

(Continued)

*Primary Examiner* — Jennifer Robertson
(74) *Attorney, Agent, or Firm* — Terence P. O'Brien; Todd A. Rathe (57) ABSTRACT

An apparatus includes a flywheel, a first pivotable caliper, a first magnet supported by the first caliper opposite the flywheel, a second pivotable caliper and a second magnet supported by the second caliper opposite the flywheel. In one implementation, the apparatus further includes a first cam follower coupled to the first caliper, a second cam follower coupled to the second caliper and at least one cam member including a first cam surface against which the first cam follower moves and a second cam surface against which the second cam follower moves, wherein movement of the at least one cam member pivots the first caliper and the second caliper to move the first magnet and the second magnet relative to the flywheel. In another implementation, the apparatus further includes a strain gauge carried by the first caliper to output signals indicating braking torque.

20 Claims, 12 Drawing Sheets

(51) Int. Cl.
  *A63B 21/00* (2006.01)
  *F16D 129/06* (2012.01)
  *F16D 121/28* (2012.01)
  *A63B 21/22* (2006.01)
  *F16D 121/14* (2012.01)
  *F16D 121/20* (2012.01)

(56) References Cited

U.S. PATENT DOCUMENTS

| | | | |
|---|---|---|---|
| 7,658,698 B2 | 2/2010 | Pacheco et al. | |
| 7,691,034 B2 | 4/2010 | May et al. | |
| 7,704,192 B2 | 4/2010 | Dyer et al. | |
| 7,780,577 B2 | 8/2010 | Arnold | |
| 7,931,566 B1 | 4/2011 | Radke et al. | |
| 7,981,001 B2 | 7/2011 | Stearns et al. | |
| 8,235,873 B1 | 8/2012 | Stearns et al. | |
| 8,323,155 B2 | 12/2012 | Ohrt et al. | |
| 8,585,561 B2 | 11/2013 | Watt et al. | |
| 8,663,072 B2 | 3/2014 | Stewart et al. | |
| 8,672,814 B2 | 3/2014 | Hopkins | |
| 8,851,235 B2 | 10/2014 | Allington et al. | |
| 8,876,668 B2 | 11/2014 | Hendrickson et al. | |
| 8,882,637 B2 | 11/2014 | Ainsworth et al. | |
| 8,932,185 B2 | 1/2015 | Hsieh | |
| 9,011,291 B2 | 4/2015 | Birrell | |
| 9,050,498 B2 | 6/2015 | Lu et al. | |
| 9,126,078 B2 | 9/2015 | Anderson et al. | |
| 9,272,182 B2 | 3/2016 | Ohrt et al. | |
| 9,418,349 B2 | 8/2016 | Ainsworth et al. | |
| 9,468,794 B2 | 10/2016 | Barton | |
| 9,468,795 B2 | 10/2016 | Arnold et al. | |
| 9,579,555 B2 | 2/2017 | Lagree | |
| 9,586,085 B2 | 3/2017 | Arnold et al. | |
| 9,586,089 B2 | 3/2017 | Lagree | |
| 9,597,540 B2 | 3/2017 | Arnold | |
| 9,604,096 B2 | 3/2017 | Arnold et al. | |
| 9,636,543 B2 | 5/2017 | Dyer et al. | |
| 9,643,051 B1 | 5/2017 | Lagree | |
| 9,700,755 B2 | 7/2017 | Giannelli et al. | |
| 9,724,559 B2 | 8/2017 | Chang et al. | |
| 9,724,566 B2 | 8/2017 | Birrell | |
| 2003/0109362 A1* | 6/2003 | Lee | A63B 21/0051 482/63 |
| 2006/0094569 A1* | 5/2006 | Day | A63B 21/015 482/57 |
| 2006/0234840 A1* | 10/2006 | Watson | A63B 24/00 482/61 |
| 2010/0234185 A1 | 9/2010 | Watt et al. | |
| 2012/0071301 A1* | 3/2012 | Kaylor | A63B 21/00058 482/57 |
| 2014/0080675 A1 | 3/2014 | Anderson | |
| 2014/0248999 A1 | 9/2014 | Lu et al. | |
| 2016/0023082 A1 | 1/2016 | Hamilton | |
| 2016/0089562 A1 | 3/2016 | Grossmann | |
| 2016/0151660 A1 | 6/2016 | Ohrt et al. | |
| 2016/0263415 A1 | 9/2016 | Chen et al. | |
| 2016/0263417 A1 | 9/2016 | Golesh | |
| 2016/0346586 A1 | 12/2016 | Pullins et al. | |
| 2016/0375300 A1 | 12/2016 | Chang et al. | |

* cited by examiner

VARIABLE DISTANCE EDDY CURRENT BRAKING SYSTEM

RELATED U.S. APPLICATION DATA

The present application claims the benefit of the filing date under 35 U.S.C. § 119(e) of U.S. Provisional Patent Application Ser. No. 62/242,776, filed on Oct. 16, 2015, which is hereby incorporated by reference in its entirety.

BACKGROUND

Fitness equipment units or exercise devices frequently employ a braking system to provide resistance against movement of a member being moved by a person exercising. Examples of fitness equipment units or exercise devices that employ a braking system include stationary bicycles, elliptical machines and adaptive motion machines. Such braking systems may provide direct contact, magnetic or fan based resistance.

DETAILED DESCRIPTION OF EXAMPLES

Figure 1:
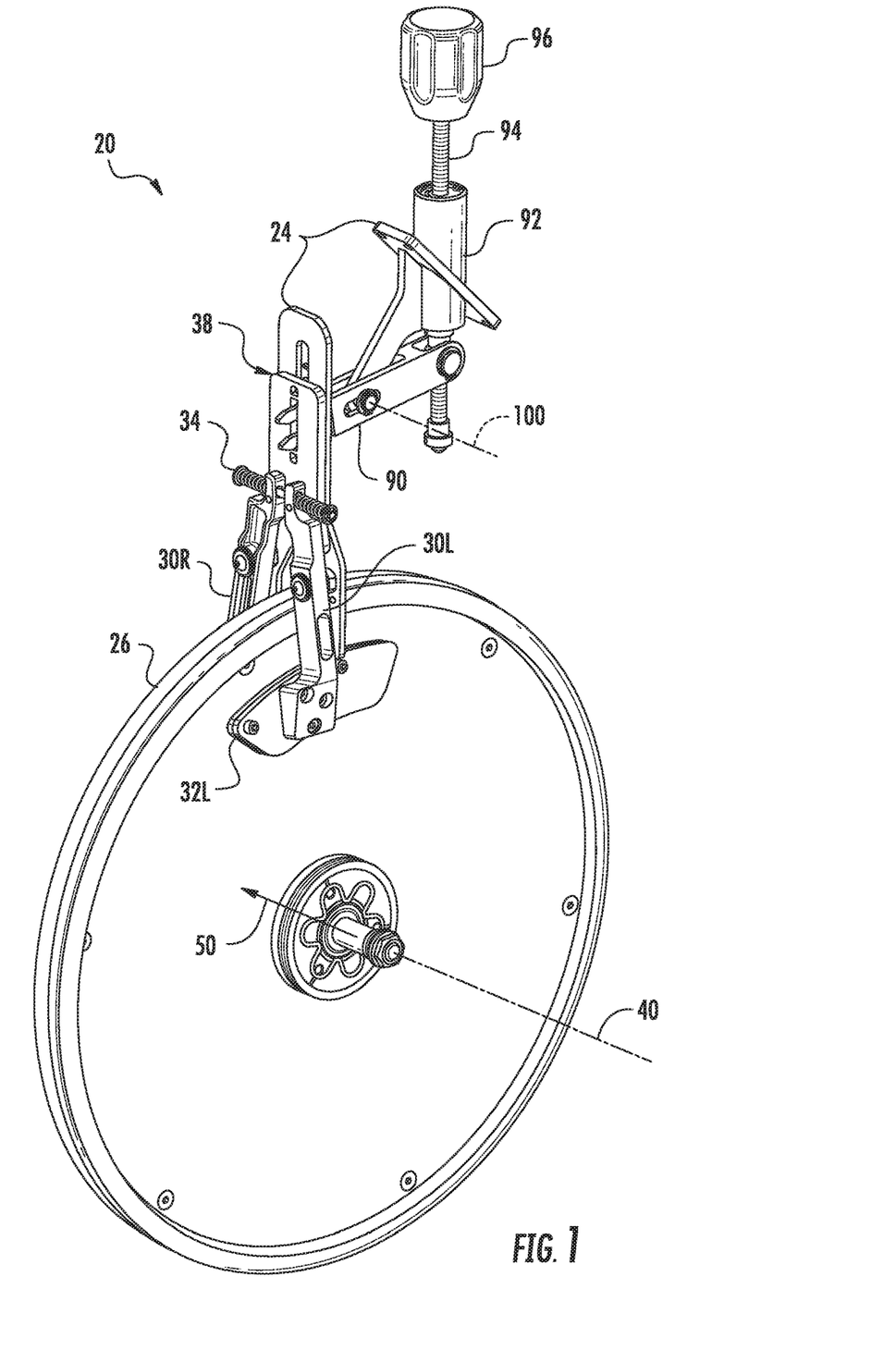
FIG. 1 is a front perspective view of an example variable distance eddy current braking system.
Figure 2:
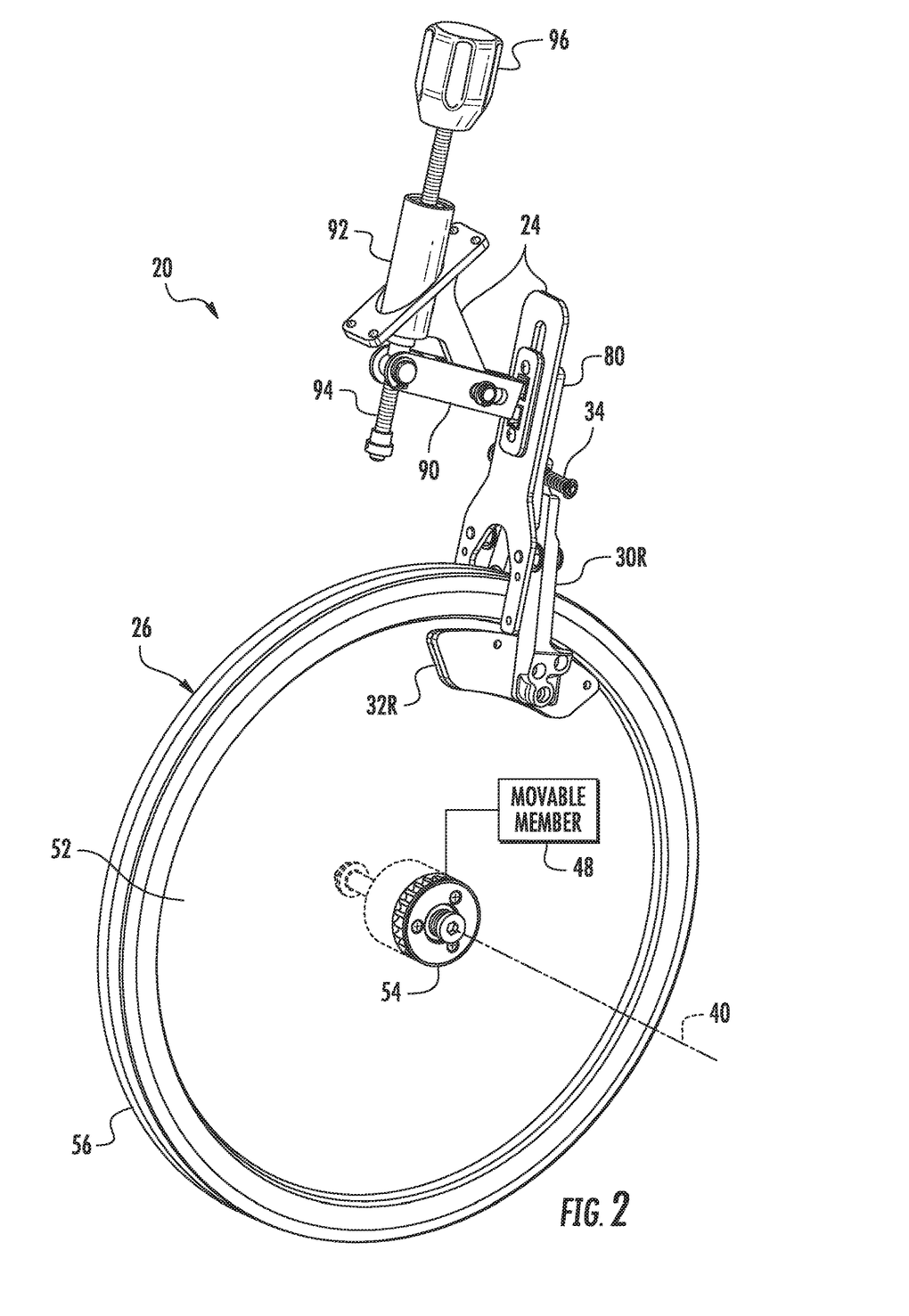
FIG. 2 is a rear perspective view of the braking system of FIG. 1.

FIGS. 1 and 2 are perspective views of an example variable distance eddy braking system 20. Variable distance eddy braking system 20 may be employed in a variety of different exercise machines or fitness equipment units. In one implementation, variable distance a braking system 20 is configured specifically for use in a stationary bicycle. In other implementations, braking system 20 may be resized or slightly reconfigured for use in a fitness equipment units such as an elliptical machine or an adaptive motion machine. As will be described hereafter, braking system 20 provides relatively compact and low-cost, non-contact braking system that offers more linear braking force adjustments.

Braking system 20 comprises a frame 24, a flywheel 26, calipers 30L, 30R (collectively referred to as calipers 30), magnets 32L, 32R (collectively referred to as magnets 32), a biasing element 34, and a brake actuator 38. Frame 24 comprises a stationary structure provided as part of the fitness equipment unit in which braking system 20 is employed. Frame 24 rotatably supports flywheel 26. Frame 24 further pivotably supports calipers 30 or movably supports various components of actuator 38. Frame 24 may have a variety of different sizes, shapes and configurations.

Flywheel 26 comprises a structure rotatably supported about axis 40 by frame 24. Flywheel 26 is operably coupled to a movable member 48 (schematically shown in FIG. 2), wherein flywheel 26 provides a structure in which eddy currents are induced to resist movement of the movable member 48 so as to provide the person exercising with resistance. In one implementation, the movable member 48 comprises a pair of pedals operably coupled to flywheel 26 by a gear train, chain and sprocket arrangement or belt and pulley arrangement. In other implementations, movable member 48 may comprise other members that receive force from a person exercising such as footpads that are driven in an elliptical path by a person exercising.

For purposes of this disclosure, the term "coupled" shall mean the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature. The term "operably coupled" shall mean that two members are directly or indirectly joined such that motion may be transmitted from one member to the other member directly or via intermediate members.

In the example illustrated, flywheel 26 comprises axle 50, eddy current induction member 52, drive coupler 54 and perimeter weighted ring 56. Axle 50 is supported by frame 24 and extends through member 52 while supporting bearings (not shown) that extend between axle 50 and member 52 to facilitate rotation of member 52 about axis 40. Axle 50 further rotatably supports drive coupler 54 which is fixedly coupled to member 52 and which also rotates about axis 40.

Eddy current induction member 52 comprise a structure having at least an electrically conductive portion opposite to and between magnets 32. In the example illustrated, a majority and substantially an entirety of member 52 is formed from an electrically conductive material, such as a ferrous material. In other implementations, only portions of member 52 are electrically conductive. For example, in one implementation, eddy current induction member 52 may alternatively comprise an annular ring having an electrically conductive surface, and electrically conductive core or being entirely electrically conductive, wherein the annular ring, during its rotation about axis 40, travels between and opposite to magnets 32. In the example illustrated, eddy current induction member 52 comprises a substantially flat circular disk having a uniform thickness and formed from a ferrous material. In other implementations, eddy current induction member 52 may have other shapes and may have varying thicknesses.

Drive coupler 54 comprises a member that fixedly coupled to member 52 and that facilitates connection to movable member 48 (shown in FIG. 2). The example illustrated, drive coupler 54 is fastened to member 52. In other implementations, drive coupler 54 is welded or integrally formed as a single unitary body with member 52. In the example illustrated, drive coupler 54 comprises a hub having circumferential teeth, facilitating connection through the use of a gear train, a chain or a toothed belt. In other implementations, drive coupler 54 may have other configurations.

Figure 3:
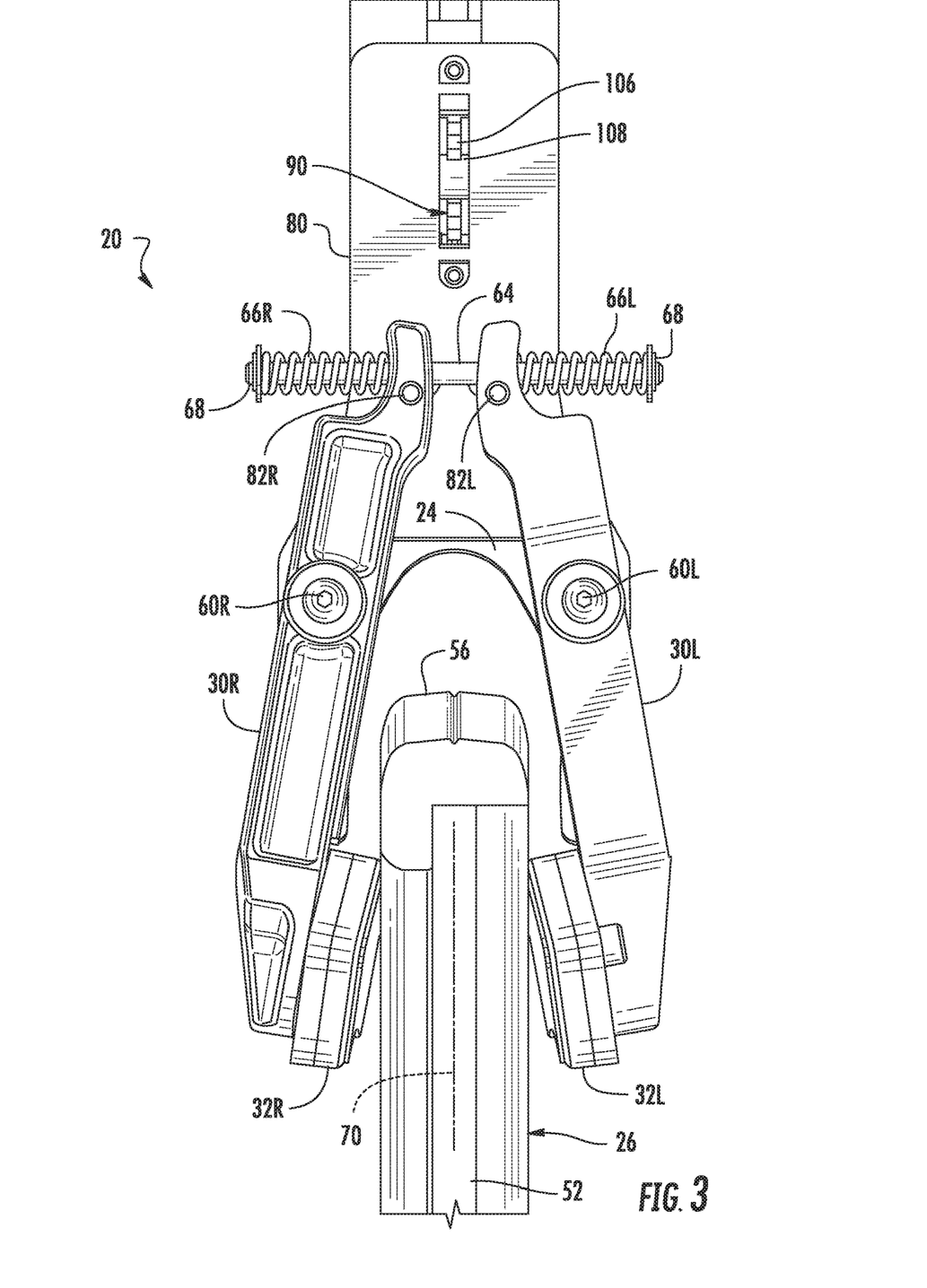
FIG. 3 is an enlarged sectional view of a portion of the braking system of FIG. 1.

Perimeter weight ring 56 comprises a ring extending along or proximate to the perimeter of member 52. Perimeter weight ring 56 provide a region of higher weight along the perimeter of member 52 to provide enhanced inertia along the perimeter of member 52. FIG. 3 is a sectional view through flywheel 26 illustrating weight ring 56. In the example illustrated, weight ring 56 comprises a separate structure connected to a perimeter of member 52. In other implementations, weight ring 56 may be provided and formed as a single unitary body with member 52. In yet other implementations, weight ring 56 may be omitted.

As shown in more detail in FIG. 3, calipers 30L, 30R comprise a pair of arms extending on opposite sides of flywheel 26 and pivotably supported by frame 24 for rotation about axes 60L, 60R (collectively referred to as axes 60), respectively. Calipers 30L, 30R support magnets 32L, 32R, respectively, opposite to the eddy current induction member 52. Pivoting of calipers 30 about axes 60 adjusts the spacing between magnets 32 and electrically conductive portion of member 52 to adjust the induction of eddy currents within member 52 so as to adjust an amount of resistance provided by braking system 20.

Magnets 32 comprise permanent magnets supported by calipers 30 opposite to the election conductive portions of member 52. In one implementation, magnets 32 comprise rare earth magnets.

Biasing element 34 resiliently biases calipers 30 relative to member 52, wherein actuator 38 works against the biasing element 34 when adjusting the resistance provided by system 20. In the example illustrated, wherein actuator 30 utilizes a cam member having cam surfaces that guide movement of camp followers coupled to or extending from calipers 30 (as described hereafter), biasing element 34 further resiliently biases the camp followers against the camp surfaces, to ensure contact between the cam follower and cam surfaces or reducing manufacturing tolerances issues with respect to the cam follower and cam surfaces.

In the example illustrated, biasing element 34 comprises shaft 64 and compression springs 66L, 66R (collectively referred to as springs 66). Shaft 64 extends through each of calipers 30 on a side of axes 60 opposite to magnets 32. Calipers 30 are slidable along the axis of shaft 64 against the biasing forces from compression springs 66. Springs 66 are captured between upper portions of calipers 30 and heads 68 of shaft 64. Spring 66 resiliently urge the upper portions of calipers 30 towards one another and thereby resiliently urge magnets 32 away from opposite sides of member 52. In the example illustrated, springs 66L and 66R are identical to one another.

In other implementations, biasing element 34 may have other configurations. For example, in other implementations, biasing element 34 may alternatively resiliently urge magnets 32 towards the opposite side of member 52. In one implementation, braking system 20 may alternatively comprise a single compression spring along shaft 64 between the end portions of calipers 30. In yet other implementations, braking system 20 may alternatively comprise a single spring or multiple springs and exert force against portions of calipers 30 below axes 60. In still yet other implementations, biasing element 34 may alternatively exert a force upon a cam member (described hereafter) rather than directly upon calipers 30. In some implementations, biasing element 34 may be omitted.

Actuator 38 comprises a mechanism to adjust the relative positions of magnets 32 relative to the electrically conductive portions of member 52 while also retaining magnets 52 in an established position with respect to member 52. Actuator 38 pivots calipers 30 about axes 60 such that calipers 60 open and close with respect to one another while supporting magnet 32 at roughly the same distance from the center 70 of flywheel 26. As will be described hereafter, actuator 38 deploys magnets 52 in a manner such that magnets 32 pivot at varying rates about axis 60, dependent upon the present angular positioning of calipers 30, in response to a given amount of input so as to provide a more linearized adjustment in the amount of braking force being produced by system 20.

Figure 4:
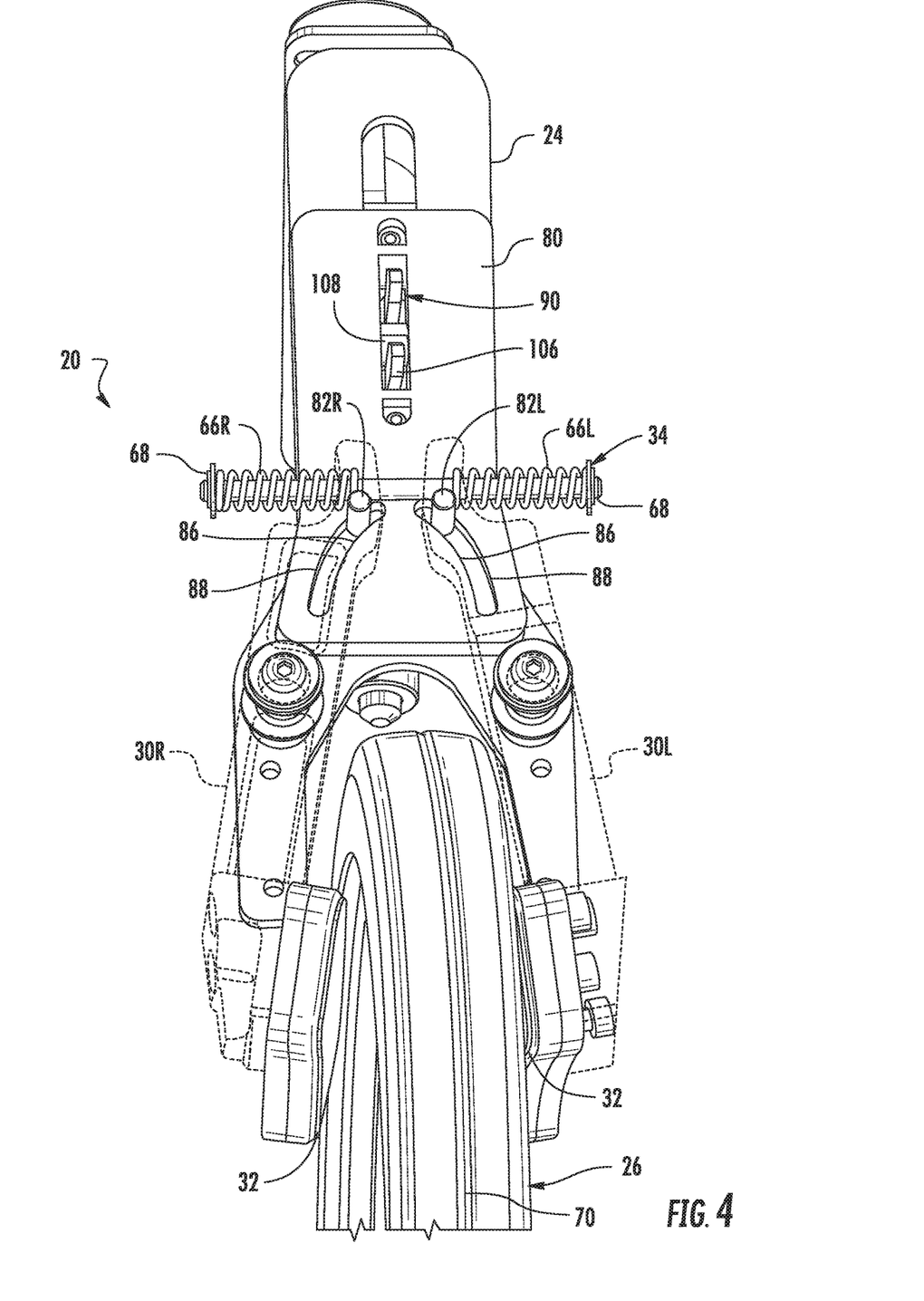
FIG. 4 is an enlarged perspective view of the portion of the braking system shown in FIG. 3 with calipers transparently illustrated.
Figure 5:
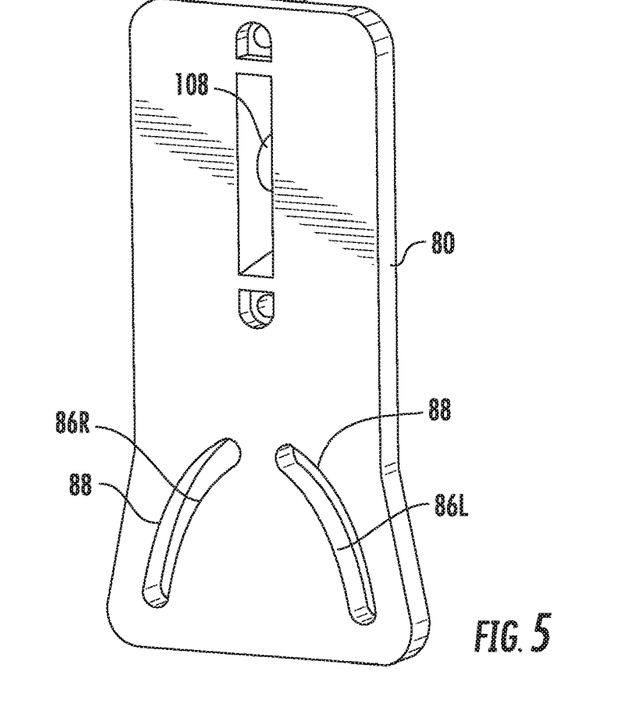
FIG. 5 is a perspective view of an example cam member of the braking system of FIG. 1.

Actuator 38 comprises cam member 80, cam followers 82 and cam adjuster 84. Cam member 80 comprises a member movably supported by frame 24 for transmitting motion to calipers 32 calipers 30 so as to adjust the positioning of magnets 32. FIGS. 4 and 5 illustrate cam member 80 in detail. FIG. 4 is a fragmentary view of system 20 with calipers 30 transparently illustrated. FIG. 5 illustrates cam member 80 independent of the rest of braking system 20.

As shown by FIGS. 4 and 5, cam member 80 comprises cam surfaces 86L and 86R left front collectively referred to as cam surfaces 86). Cam surfaces 86 contact and guide movement of cam followers 82 as cam member 80 is vertically moved by cam adjuster 84. In the example illustrated, cam surfaces 86 symmetrically diverge from one another in directions away from the centerline 70 of flywheel 26. In the example illustrated, cam surfaces 86 each have a curved profile. In the example illustrated, the curved profiles of cam surface 86L and 86R do not have radiuses or radii centered about a common axis.

The curved profile of cam surfaces 86 guide movement of cam followers 82 to pivot calipers 30 about their respective axes 60 at varying rates for a given degree or distance of movement of cam member 30. For example, when cam followers 82 are engaging a first portion of cam surfaces 86, movement of cam member 80 by a distance may result in calipers 30 being pivoted by a first angular extent, whereas when cam followers 82 are engaging a second different portion of cam surfaces 86, movement of cam follower 80 by the same distance they result in calipers 30 being pivoted by a second angular extent different than the first angular extent. The profile of cam surfaces 86 adjust angular extent to which calipers 30 are pivoted or rotated about their axes 60 when at different angular positions, such that the adjustment or change in the normal or perpendicular distance separating magnets 32 and the side faces of member 52 of flywheel 26 (and the corresponding eddy current braking force or resistance) remains substantially constant for a given degree of movement of cam member 80. The profile of cam surfaces 86 provides the arcuate path of calipers 30 when rotating about axes 60. Because changes in the perpendicular or normal spacing between magnets 32 and flywheel 26 in response to movement of cam member 80 by a given distance are more uniform, the user may more quickly and accurately adjust the positioning of magnets 32 to achieve a desired braking resistance.

In the example illustrated, cam member 80 comprises a substantially flat plate, wherein cam surfaces 86 are provided by a pair of grooves or channels 88 formed within the plate. In the illustrated example, cam surfaces 86 are formed along the inside surfaces of such channels 88, those surfaces of the two different channels 88 that are closest to one another. In other implementations, cam surfaces 86 may be provided in other manners. For example, in other implementations, cam surfaces 86 may be provided by the outer perimeter edges of a cam member, wherein cam followers ride along the outer perimeter edges outside of the cam member. In yet other implementations in which calipers 30 and their associated cam followers 82 are resiliently biased in an outward direction, away from one another, rather than in an inward direction towards one another, cam surfaces 86 may alternatively be provided along the outer surfaces of channels 88 or along the inner edges of a cam member, wherein cam followers 82 ride against the inner rotor edges inside of the cam member. In other implementations, cam member 88 comprise a structure other than a flat plate while providing such cam surfaces 86. In some implementations, cam member 88 may be supplanted with two cam members, each cam member providing one of the cam surfaces 86, wherein the two cam members are driven or moved by cam adjuster 84. In another implementation, the cam member may be replaced by a four-bar linkage or other structure to provide the desired path of travel of the calipers. In one particular implementation, a four-bar linkage or other assembly can be used to provide a more linear path of motion in which the magnets are selectively drawn closer to, or further away from, the flywheel. In another implementation, the braking system can be configured to produce a rotational movement of the magnets with respect to the flywheel. The rotational movement of the magnets can be done separately or in conjunction with translational, linear or curved path of travel of the magnets.

Cam followers 82 comprise structures that extend from the respective calipers 30 and that ride against cam surfaces 86. In the example illustrated, cam followers 82 comprise pins fixed to their respective calipers 30, or the pins project into grooves 88 where biasing member 34 resiliently urges cam followers 82 against the inner edges of grooves 88.

Although cam followers 82 are illustrated as being fixedly coupled to and extending from the respective calipers 30, in other implementations, cam followers 82 may alternatively extend from cam member 80 while cam surfaces 86 are formed within the respective calipers 30 such that biasing member 34 resiliently biases cam surfaces 86 against the cam followers 82. In such an implementation, vertical movement of cam member 80 would result in a vertical movement of cam followers 82 so as to transmit motion to calipers 30 through the interaction with cam surfaces 86 to control the rate at which calipers 30 pivot about axes and to provide a more linearized rate of resistance adjustment in response to movement of cam member 80.

Figure 6:
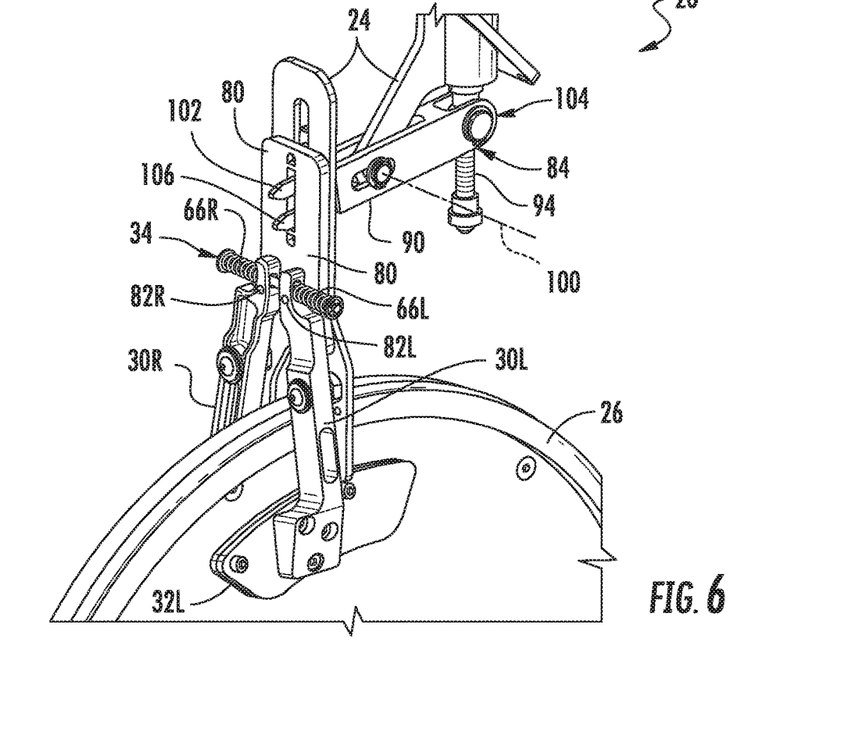
FIG. 6 is an enlarged fragmentary perspective view of a portion of the braking system of FIG. 1.

Cam adjuster 84 comprises a mechanism to vertically raise and lower cam member 80 while also retaining cam member 80 at a selected or desired position once raised or lowered. In the example illustrated, as shown by FIGS. 1, 2 and 6, cam adjuster 84 comprises lever 90, nut 92, threaded shaft 94 and knob 96. Lever 90 comprises an elongated member pivotably pinned or coupled to frame 24 for pivotal movement about axis 100. Lever 90 has a first end portion 102 pivotably coupled to cam member 80 and a second end portion 104 pivotably coupled to shaft 94. As a result, downward movement of shaft 94 pivots lever 90 to raise cam member 80 whereas upward move to shaft 94 pivots lever 92 lower cam member 80.

In the example illustrated, end portion 102 comprises a fork 106 extending through a supporting plate of frame 24 and through the plate of cam member 80 where fork 106 receives a cylindrical shaft 108 of cam member 80. In other implementations, end portion 102 may alternatively be pivotably coupled to cam member 80 by being pinned, bolted or otherwise coupled to cam member 80. In the example illustrated, end portion 14 is pinned to shaft 94.

Nut 92 comprises an internally threaded sleeve or cylinder fixedly supported by frame 24. Threaded shaft 94 comprises an elongated shaft having a threaded portion to readily engaging the internal threads of nut 92. A lower portion of shaft 94 is pivotably coupled to end portion 104 of lever 90. In upper portion of shaft 94 is fixedly coupled to knob 96. Knob 96 facilitates manual rotation of shaft 94. Manual rotation of shaft 94 raises and lowers shaft 94 to pivot lever 90 about axis 100 so as to selectively raise or lower cam member 80 to adjust the positioning of cam member 80 and thereby adjust the spacing between magnets 32 and flywheel 26. Because such adjustment is achieved using the interaction of not 92 and threaded shaft 94, precise incremental adjustment of cam member 80 may be achieved.

In other implementations, the selective adjustment of cam member 80 may be achieved in other fashions. For example, in other implementations, a ratchet or other adjuster mechanism may be used. In yet other implementations, in lieu of being manually adjusted, cam member 80 may alternatively be moved or adjusted through one or more powered actuators. For example, in other implementations, an electric solenoid, operating under control signals from a controller, may be used to selectively raise and lower shaft 94, to selectively pivot lever 90 or to directly move cam member 80. In other implementations, a stepper motor or other electric motor 80 may be used to selectively rotationally drive shaft 94. In yet other implementations, a hydraulic or pneumatic cylinder-piston assembly may be used to raise or lower shaft 94, pivot lever 90 or directly engage and move cam member 80. In implementations where cam member 80 is selectively raised and lowered to adjust braking torque by powered mechanism, braking system 20 may be controlled in response to control signals from a controller so as to vary or adjust the braking force or resistance at programed selected points in time during an exercise program or routine without user intervention.

Figure 7:
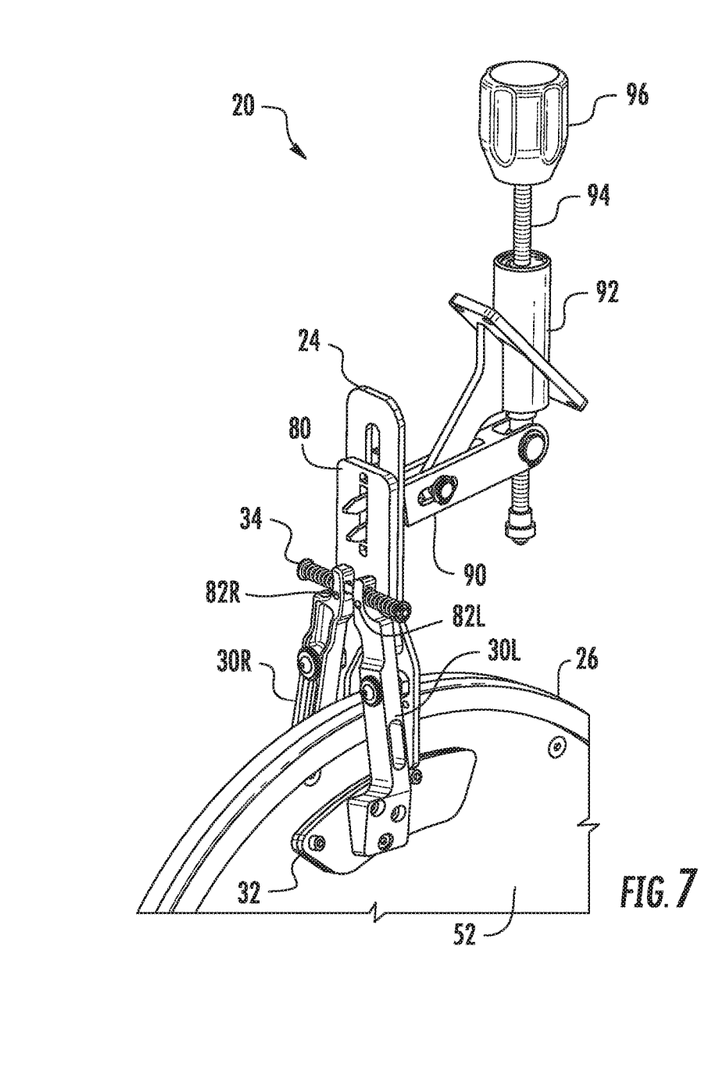
FIG. 7 is a fragmentary perspective view of a portion of the braking system of FIG. 1 in a first braking state.
Figure 8:
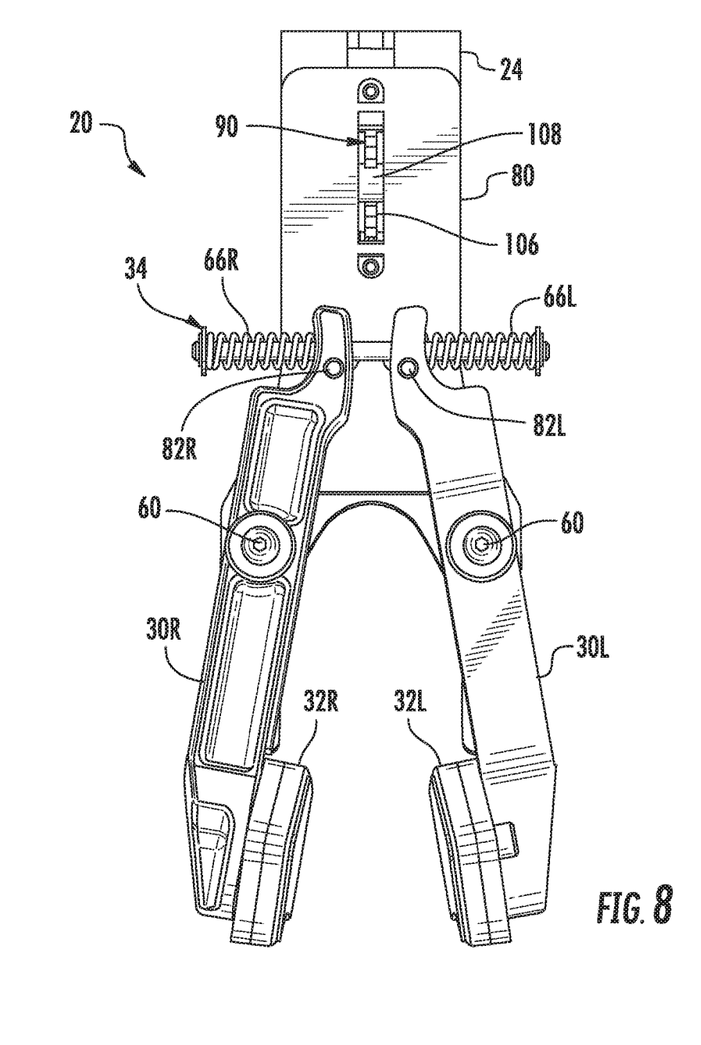
FIG. 8 is an enlarged front view of a portion of the braking system of FIG. 1 in the first braking state.

FIGS. 7-10 illustrate one example of an adjustment of the braking resistance provided by system 20. FIGS. 7 and 8 illustrate braking system 20 in a first state providing a first amount of resistance against rotation of flywheel 26. In the state shown in FIGS. 7 and 8, threaded shaft 94 has been raised, through the rotation of knob 96, such that lever 90 as pivoted about axis 100 (FIG. 6) lowers earn member 80. As a result, biasing member 34 resiliently urges cam followers 82 against earn surfaces 86 to a position near a top of cam surfaces 86 (the top of channels 88). As a result, caliper 92L is pivoted in a counterclockwise direction while caliper 92R is pivoted in a clockwise direction to move magnets 32 in directions away from member 52 of flywheel 26 (shown in FIG. 7). The large normal or perpendicular spacing between magnets 32 and member 52 provide a lower level of braking torque or resistance against rotation of flywheel 26.

Figure 9:
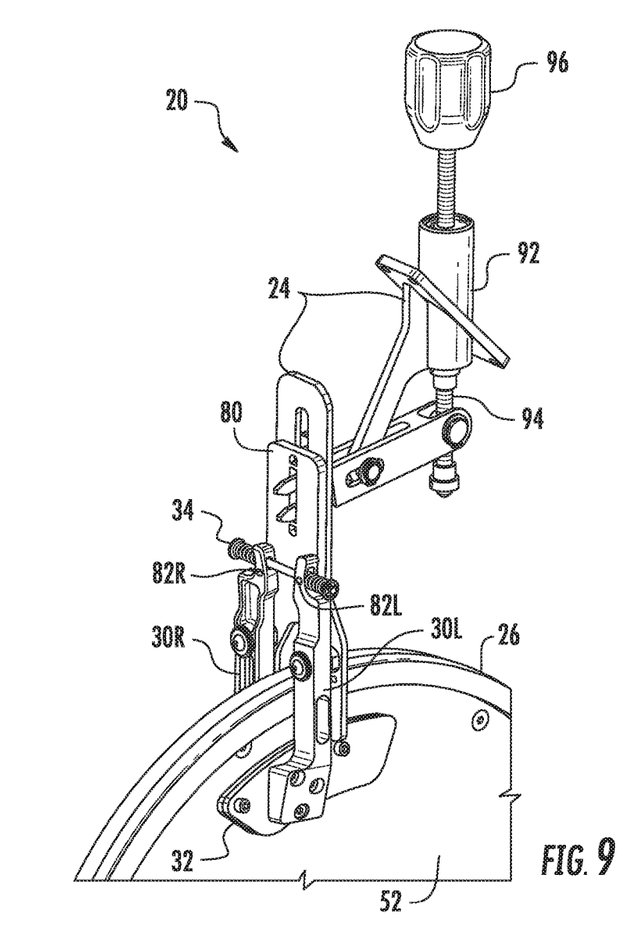
FIG. 9 is a fragmentary perspective view of a portion of the braking system of FIG. 1 in a second braking state.
Figure 10:
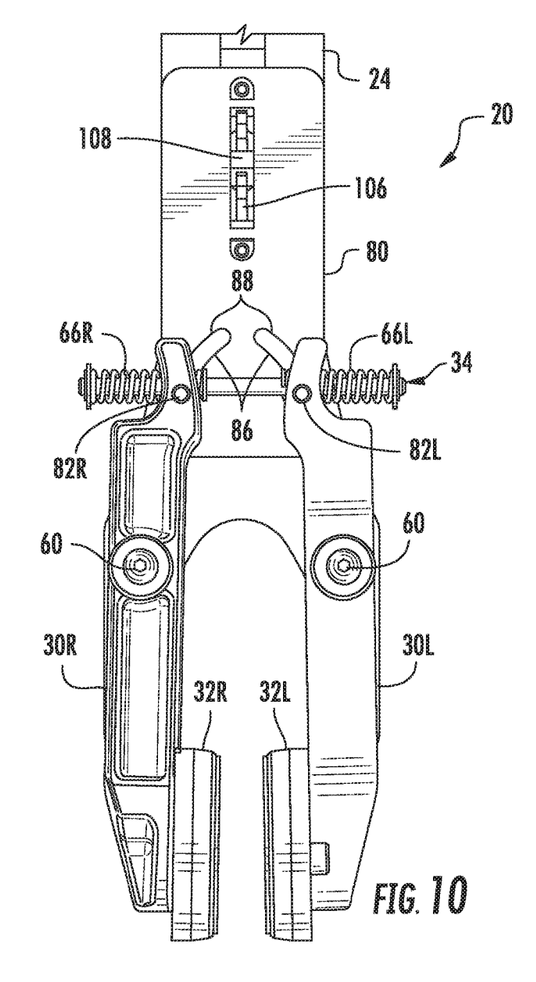
FIG. 10 is an enlarged front view of a portion of the braking system of FIG. 1 in the second braking state.

By way of contrast, FIGS. 9 and 10 illustrate braking system 20 in a second state providing a second greater amount of resistance against rotation of flywheel 26. In the state shown in FIGS. 9 and 10, threaded shaft 94 has been lowered, through the rotation of knob 96, such that lever 90 as pivoted about axis 100 and lower cam member 80. As a result, biasing member 34 resiliently urges cam followers 82 against cam surfaces 86 to a position near a bottom of cam surfaces 86 (the bottom or lower end of channels 88). As a result, caliper 92L is pivoted in a clockwise direction while caliper 92R is pivoted in a counterclockwise direction to move magnets 32 in directions towards member 52 of flywheel 26 (shown in FIG. 7). The reduced normal or perpendicular spacing between magnets 32 and member 52 provide a greater level of braking torque or resistance against rotation of flywheel 26.

As discussed above, the profile of cam surfaces 86 controls the rate at which calipers 92 pivot about their axes 60 for a given amount of movement of cam member 80. In the example illustrated, the profile of cam surfaces 86 controls the rate at which calipers 92 pivot about axis 60 for a given amount of rotation of knob 94 (a given amount of lowering of shaft 94 or a given degree of angular pivoting of lever 90). In the example illustrated, the profile is curved or bowed to provide a more linear response or ratio between the movement of cam member 80 and the perpendicular normal spacing between magnets 32 and flywheel 26 which corresponds to the braking resistance.

Figure 11A:
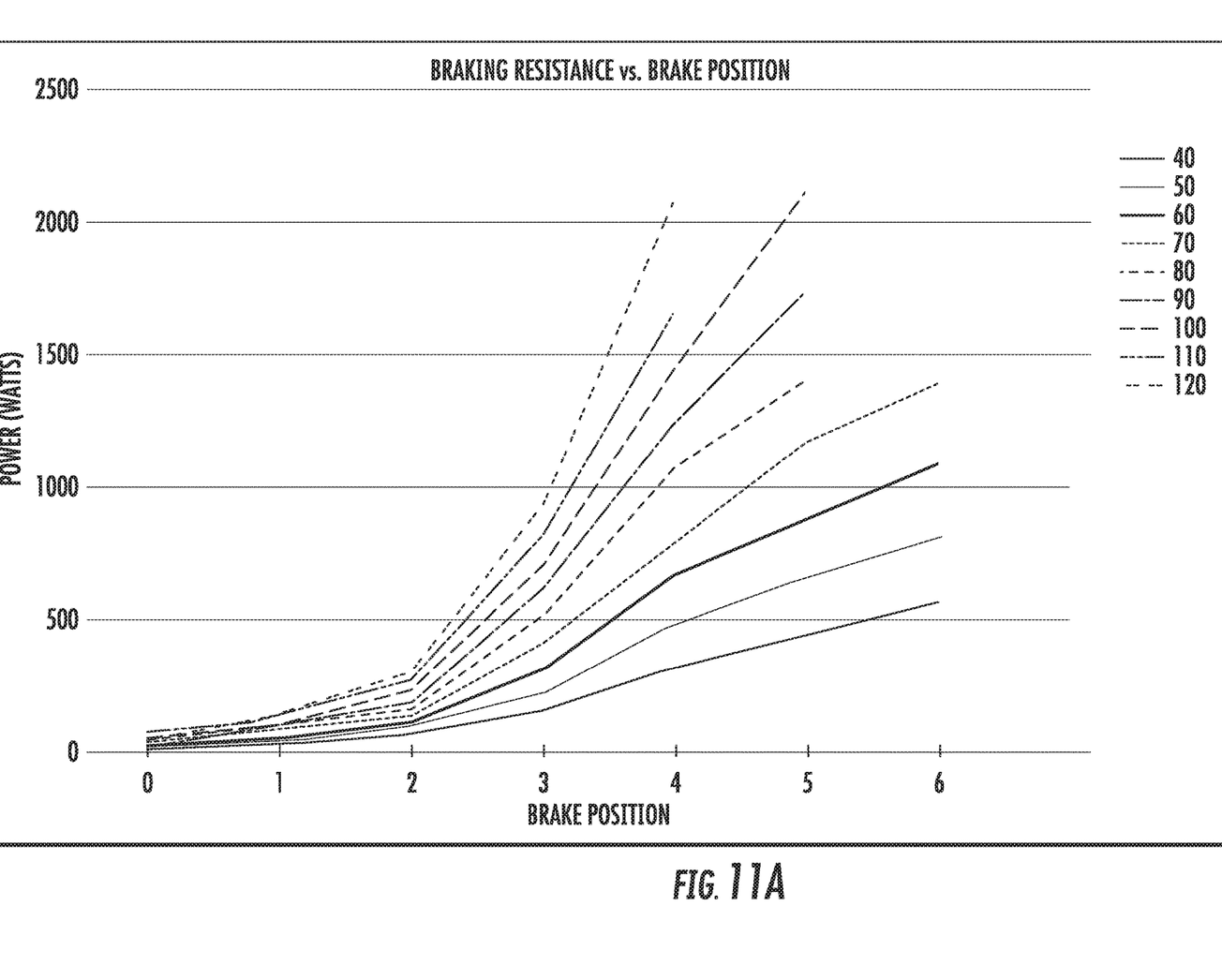
FIG. 11A is a graph comparing braking resistance versus brake position of a prior art braking system with different traces for different crank rotational speeds.
Figure 11B:
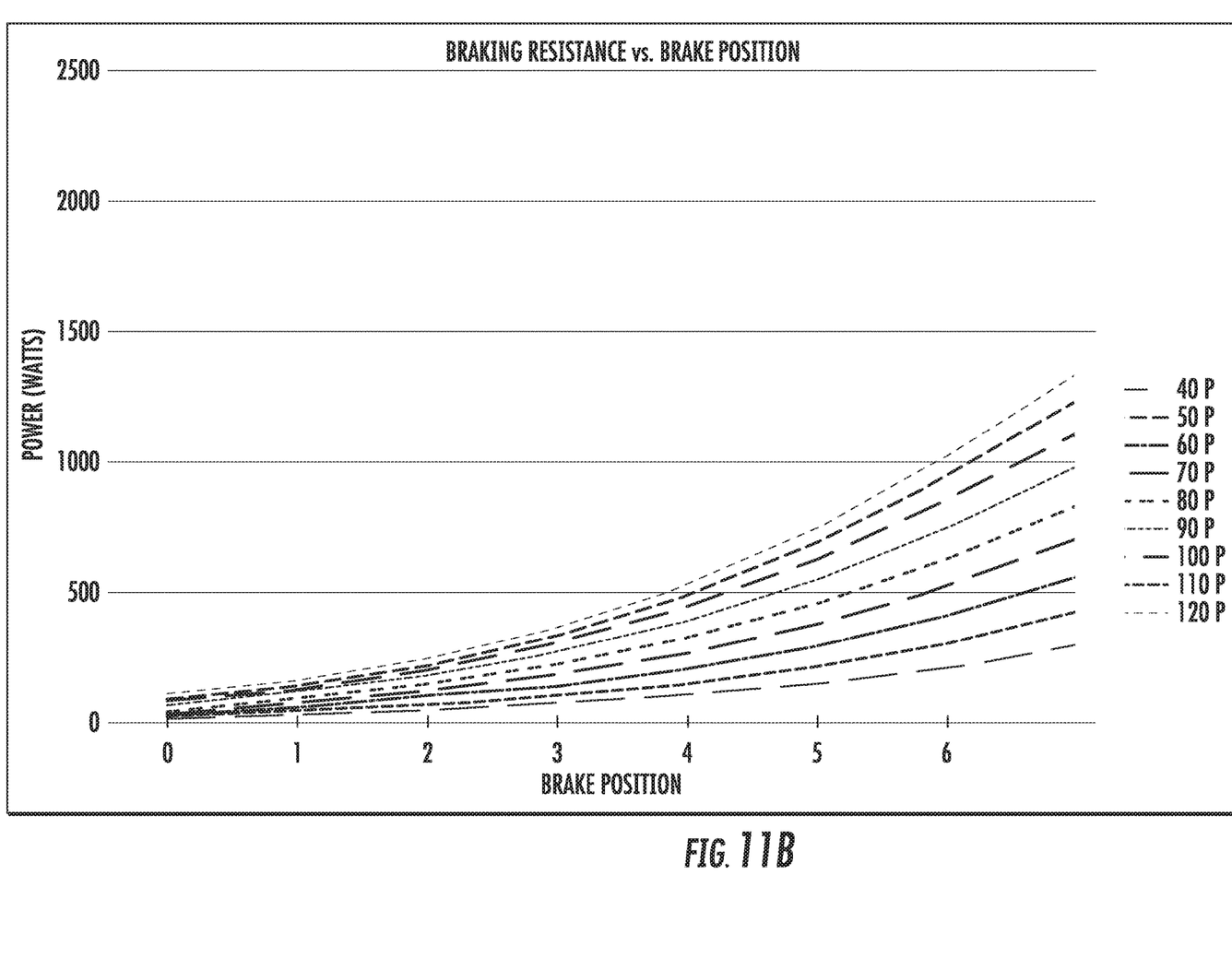
FIG. 11B is a graph comparing braking resistance versus brake position of the braking system of FIG. 1 with different traces for different crank rotational speeds.
Figure 11C:
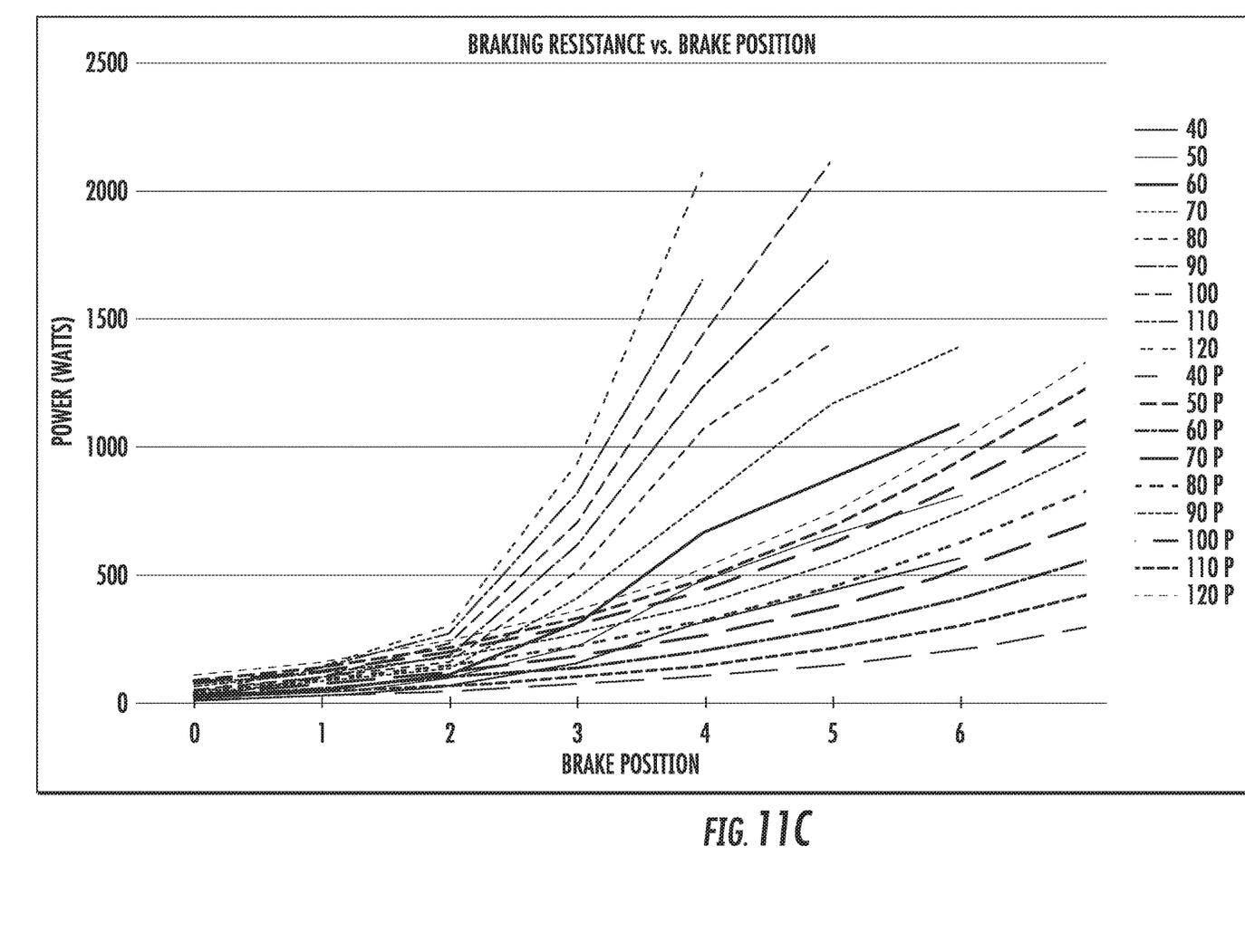
FIG. 11C is a graph overlaying the traces of FIGS. 11B and 11C.

FIGS. 11A, 11B and 11C are graphs illustrating the amount of braking resistance as measured in power (Watts) for a plurality of multiple braking positions (at least 6 resistance settings). FIG. 11A includes a plurality of traces recorded from a prior art stationary exercise cycle. In particular, the prior art stationary exercise cycle is a FreeMotion S11.0 Indoor Cycling Bike. Each trace corresponds to a different rotational speed of the crank arm about the pivot axis of the crank of the prior art brake system (e.g. 40 rpm, 50 rpm, etc. . . . ). The prior art braking system includes a carriage top down eddy current brake system. The carriage top down eddy current brake system maintains the magnets at a fixed space from each other and lowers the magnets over a flywheel. FIG. 11B illustrates the amount of braking resistance measured as power (Watts) for a plurality of braking positions for the braking system 20 of the present invention. Like FIG. 11A, each trace of FIG. 11B corresponds to a separate crank arm rotational speed about the pivot axis of the crank of a stationary exercise cycle (e.g. trace 40P corresponds to data recorded at a crank arm rotational speed of 40 rpm). FIG. 11C illustrates the traces of the prior art braking system of FIG. 11A over the traces of the braking system 20. As shown by FIGS. 11A through 11C, braking system 20 provides a more linear adjustment of braking resistance across the different available positions or settings for system 20 as compared to the alternative prior art braking system. In other words, the plot of braking resistance as a function of brake position more closely approximates a line. In contrast, the plot of braking resistance versus brake position of the alternative prior art braking system presents more of a "hockey stick" profile wherein the increase in braking resistance of the first set of settings is rather small and then rapidly increases through higher positions 3-5. The more linear braking resistance profile of the braking system 20 provides a much more desirable feel and operation that is easier to use than the alternative prior art braking system.

The magnets 32 and calipers 30 of braking system 20 allow for the magnets to be drawn closer to the flywheel 26 in a controlled manner that allows for a more linear brake resistance profile for a fitness equipment unit 200, such as an upright exercise cycle. Many upright exercise cycles utilize a flywheel 26 having a weighted ring 56 which provides an efficient, cost-effective flywheel mass to the fitness equipment unit 200. The braking system 20 is configured to enable magnets 32 and calipers 30 to extend about or around the weighted ring 56 of the flywheel 26 and provide a controlled progression of the magnets toward the eddy current induction members 52 of the flywheel 26. Accordingly, the path of travel of the magnets 32 extends around and does not interfere or engage the weighted ring 56 of the flywheel 26. Magnets of many existing exercise cycles are maintained at a constant separation distance from each other, and are positioned over a flywheel without a weighted ring. The more surface area extending over the flywheel (about each side of the flywheel), the higher the resistance created by such braking systems due to the magnets position relative to the flywheel. However, such configurations do not provide a more linear resistance path. Rather, the resistance profile of such existing braking systems can resemble a non-linear path, such as that of a hockey stick. Such constant separation distance magnet configurations are not compatible with fitness units having a flywheel with a weighted ring. Other fitness units can employ non-magnetic brake pads. However, such brake pad designs can produce excessive heat, can wear quickly and also generally provide a non-linear resistance profile.

Figure 12:
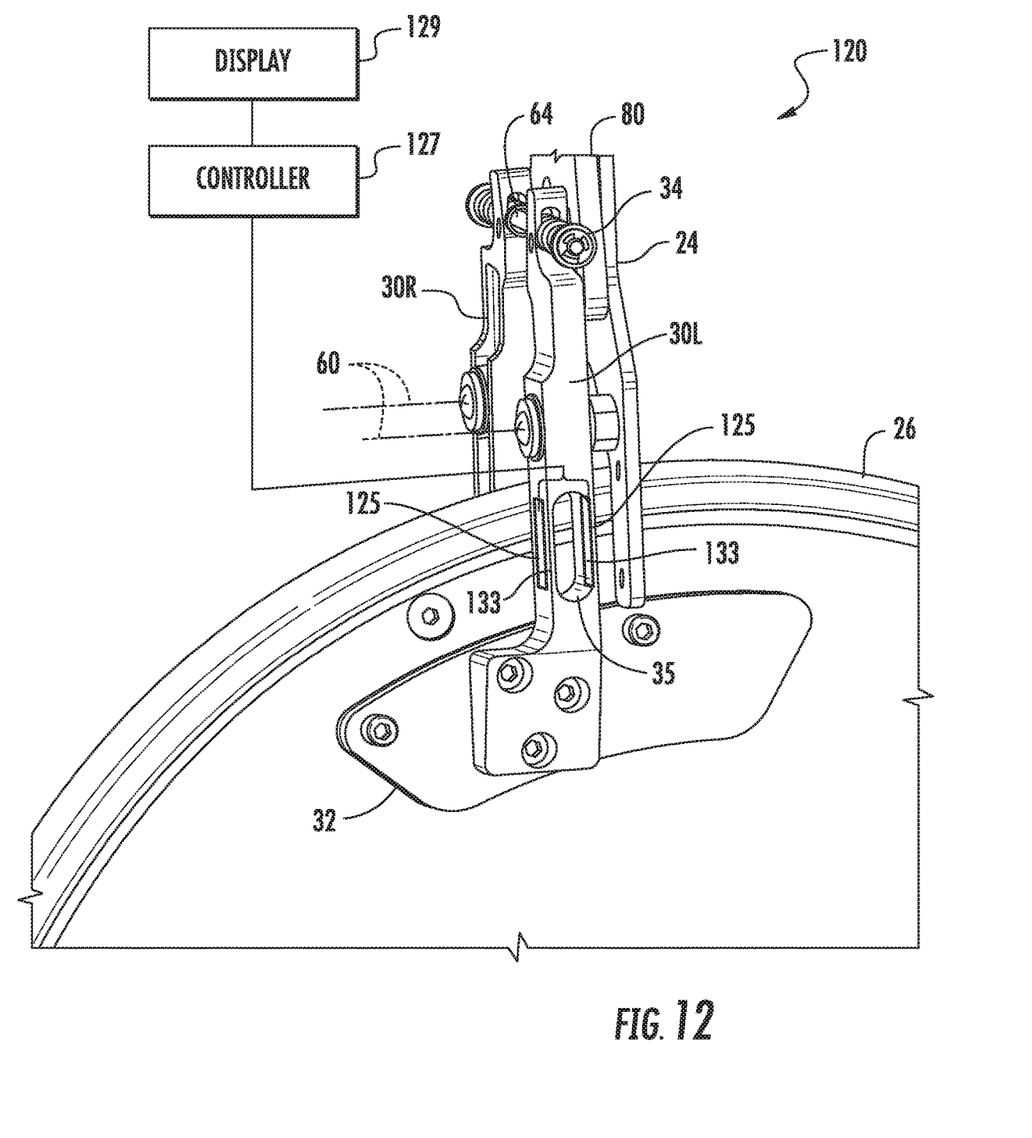
FIG. 12 is an enlarged fragmentary perspective view of another example variable distance eddy current braking system.

FIG. 12 illustrates braking system 120, another implementation of braking system 20. Braking system 120 is similar to braking system 20 except that braking system 120 additionally comprises strain sensors 125, controller 127 and display 129. Strain sensors 125 are carried by at least one of calipers 30 and detect an extent of strain upon the associated caliper 30 caused by the braking resistance provided by magnets 32 during rotation of flywheel 26. In the example illustrated, strain sensors 125 comprise strain gauges. Such strain gauges are mounted to surfaces of caliper 30L that face in directions parallel to the plane in which flywheel 26 rotates. In the example illustrated, caliper 30L comprises a pair of reduced thickness regions 133 on opposite sides of an aperture 135. The reduced thickness regions 133 more easily deflect, facilitating more detectable strain. The changes in strain experienced by reduced thickness regions 133 correspond to the amount or degree of torsional braking or resistance to rotation of flywheel 26 provided by system 20. Such signals are transmitted in a wired or wireless fashion to controller 127.

Controller 127 comprises a processing unit that receives such signals from strain sensors 125. Controller 127 further processes or converts such signals to determine a value for the ongoing amount of resistance or torsional braking being provided by system 20. Controller 127 outputs control signals causing display 129 to present such information regarding the current or ongoing amount of resistance provided by braking system 20. As a result, a person may visibly see a quantitative values regarding the amount of rotation resistance presently being provided by 20 and may make manual adjustments to the rotation of knob 96 . In other implementations where actuator 84 is a powered actuator under the control of control signals from controller 127, controller 127 By utilizing such signals from sensors 125 as feedback, such closed loop feedback may then be used to readjust the positioning of cam member 80 to provide a user selected or workout program or routine defined degree of resistance at any moment in time during a workout.

Figure 13:
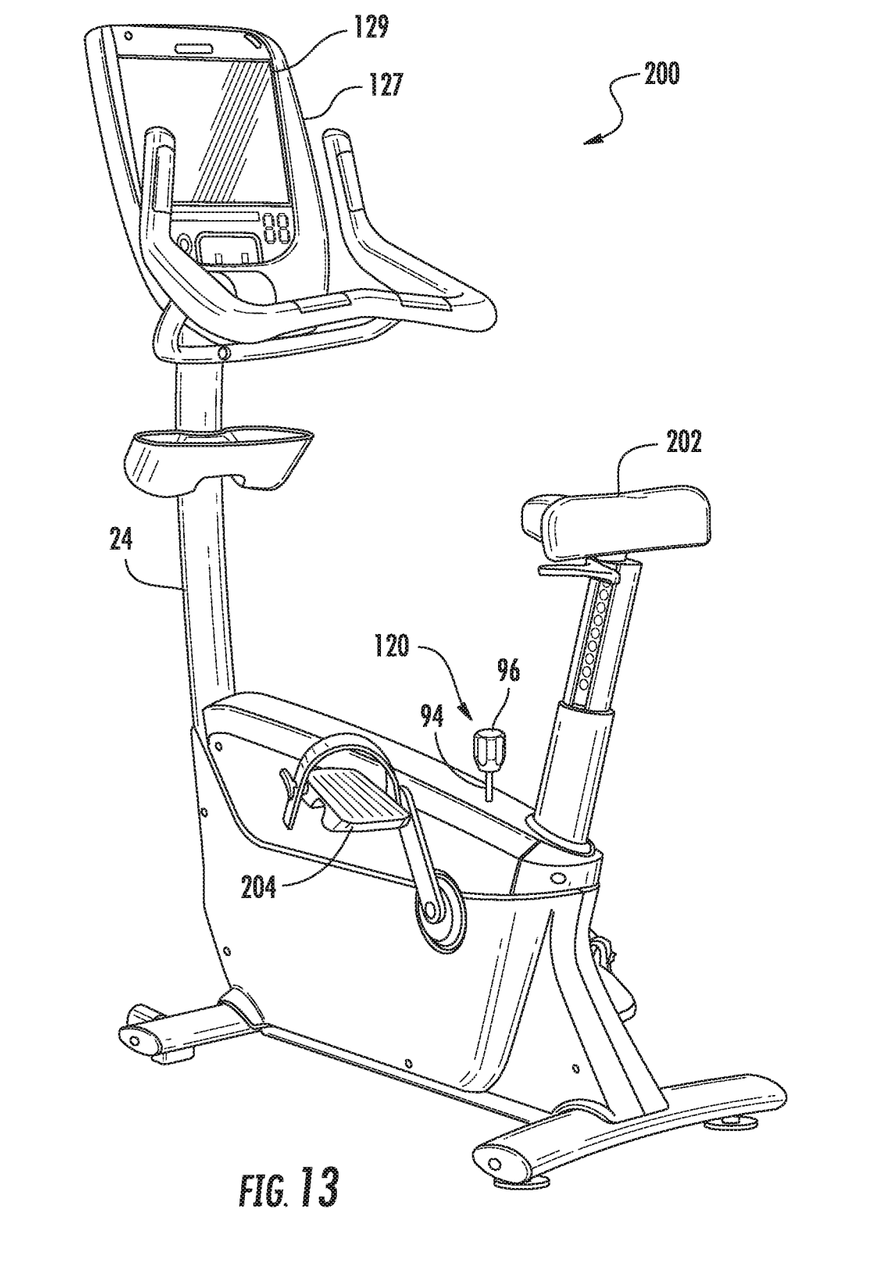
FIG. 13 is a rear perspective view of an example fitness equipment unit incorporating the variable distance eddy current braking system of FIG. 13.

FIG. 13 is a perspective view of one example fitness equipment unit 200 which utilizes braking system 120 (or braking system 20). In the example illustrated, fitness equipment unit 200 comprises a stationary exercise cycle. In the example illustrated, fitness equipment unit 200 comprises an upright stationary exercise cycle. In other implementations, the fitness equipment unit 200 can be other forms, such as, for example, a spin exercise bike or recumbent stationary exercise cycle. As shown by FIG. 13, in addition to braking system 120 described above, fitness equipment unit 200 comprises seat 202 and pedals 204. Frame 24 supports seat 202. Frame 24 further supports pedals 204 which serve as the movable member 48 described above with respect to system 20. Pedals 204 operably coupled to flywheel 26 (shown in FIGS. 1 and 2) by a gear train, chain and sprocket arrangement or a belt and pulley arrangement. In some implementations, the transmission provided by the gear train, chain and sprocket arrangement or a belt and pulley arrangement may provide a speed increase such that flywheel 26 rotates at a higher revolution rate as compared to pedals 204 being driven by the person exercising.

As described above, rotation of knob 96 raises and lowers shaft 94 two pivot lever 95 to thereby raise and lower cam member 80 (each of which is shown in FIGS. 1, 2 and 5). Raising and lowering of cam member 80 moves cam surfaces 86 against cam followers 82 to control the pivoting of calipers 30 and the positioning of magnets 32 with respect to member 52 of flywheel 26. In the example illustrated, signals from strain sensors 125 (shown in FIG. 12) are transmitted to controller 127 which presents information regarding the amount of resistance or braking torque provided by and 20 and display 129.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements.

What is claimed is:

1. An apparatus comprising:
    a flywheel;
    a forked plate;
    a first pivotable caliper pivotably supported by the forked plate;
    a first magnet supported by the first caliper opposite the flywheel;
    a second pivotable caliper pivotably supported by the forked plate;
    a second magnet supported by the second caliper opposite the flywheel;
    a first cam follower coupled to the first caliper;
    a second cam follower extending from the cam follower plate coupled to the second caliper;
    at least one cam member comprising a vertically movable cam plate extending parallel to and slidable along the first forked plate, the cam plate comprising a first cam surface against which the first cam follower moves and a second cam surface against which the second cam follower moves, wherein movement of the at least one cam member pivots the first caliper and the second caliper to move the first magnet and the second magnet relative to the flywheel to form a variable distance eddy current brake, wherein the first cam surface and the second cam surface diverge from one another and from a centerline of the flywheel and wherein the first cam surface and the second cam surface each have a curved profile such that the first cam follower and the second cam follower move along a curved path.

2. The apparatus of claim 1, wherein the vertically movable cam plate has a first two-sided channel and a second two-sided channel providing the first cam surface and the second cam surface, respectively.

3. The apparatus of claim 1 further comprising at least one bias resiliently urging the first cam follower and the second cam follower against the first cam surface and the second cam surface, respectively.

4. The apparatus of claim 1 further comprising a manual actuator to vertically raise and lower the at least one cam member to move the first cam and the second cam relative to the first cam follower and the second cam follower, respectively.

5. The apparatus of claim 1, wherein the flywheel has a perimeter weight ring.

6. The apparatus of claim 1 further comprising a strain gauge carried by the first caliper between the first magnet and a pivot axis of the first caliper so as to deflect in response to braking torque so as to output signals indicating braking torque.

7. The apparatus of claim 1 further comprising first and second pedals operably coupled to the flywheel to rotatably drive the flywheel.

8. The apparatus of claim 1 further comprising:
    a frame;
    a seat supported by the frame;
    first and second pedals operably coupled to the flywheel to rotatably drive the flywheel;
    a first sensor to sense a rate at which the flywheel is being rotatably driven;
    a second sensor to sense braking torque upon the flywheel by the first magnet and the second magnet;
    a monitor; and
    a controller to output control signals causing the monitor to display a first value based upon signals from the first sensor and a second value based upon signals from the second sensor.

9. The apparatus of claim 1, wherein the curved profile of the first cam surface has a first concave side, wherein the curved profile of the second cam surface has a second concave side and wherein the first concave side and the second concave side face one another and in opposite directions.

10. The apparatus of claim 1, wherein the flywheel has a rotational axis extending perpendicular to a plane, wherein the curved profile of the first cam surface faces the plane and wherein the curved profile of the second cam surface faces the plane.

11. The stationary bicycle of claim 1, wherein the forked plate comprises an elongate slot, the apparatus further comprising a cam adjuster comprising a pivot lever extending through the elongate slot into engagement with the cam plate, the pivot lever being pivotable to selectively raise and lower the cam plate.

12. A stationary bicycle comprising:
    a frame member having an elongate vertical slot;
    a seat supported by the frame;

a flywheel;

a first pivotable caliper pivotably supported by the frame member;

a first magnet supported by the first caliper opposite the flywheel;

a second pivotable caliper pivotably supported by the frame member;

a second magnet supported by the second caliper opposite the flywheel;

a first cam follower coupled to the first caliper;

a second cam follower coupled to the second caliper;

at least one cam member comprising a cam member comprising a first cam surface against which the first cam follower moves and a second cam surface against which the second cam follower moves, wherein movement of the at least one cam member pivots the first caliper and the second caliper to move the first magnet and the second magnet relative to the flywheel, wherein the first cam surface and the second cam surface diverge from one another and from a centerline of the flywheel and wherein the first cam surface and the second cam surface each have a curved profile such that the first cam follower and the second cam follower move along a curved path;

a cam adjuster comprising a lever extending through the elongate slot into engagement with the cam member, the lever being movable to raise and lower the cam member:

first and second pedals operably coupled to the flywheel to rotatably drive the flywheel;

a sensor to sense a rate at which the flywheel is being rotatably driven;

a monitor; and a controller to output control signals causing the monitor to display a first value based upon signals from the sensor.

13. The stationary bicycle of claim 12, wherein the least one cam member comprises a vertically movable plate having a first track and a second track providing the first cam surface and the second cam surface, respectively.

14. The stationary bicycle of claim 12 further comprising at least one bias resiliently urging the first cam follower and the second cam follower against the first cam surface and the second cam surface, respectively.

15. The stationary bicycle of claim 12, wherein the flywheel has a perimeter weight ring.

16. The stationary bicycle of claim 12 further comprising a strain gauge carried by the first caliper between the first magnet and a pivot axis of the first caliper so as to deflect in response to braking torque so as to output signals indicating braking torque.

17. The stationary bicycle of claim 12, wherein the curved profile of the first cam surface has a first concave side, wherein the curved profile of the second cam surface has a second concave side and wherein the first concave side and the second concave side face one another and in opposite directions.

18. The stationary bicycle of claim 12, wherein the flywheel has a rotational axis extending perpendicular to a plane, wherein the curved profile of the first cam surface faces the plane and wherein the curved profile of the second cam surface faces the plane.

19. An apparatus comprising:

a flywheel;

a first pivotable caliper;

a first magnet supported by the first caliper opposite the flywheel;

a second pivotable caliper;

a second magnet supported by the second caliper opposite the flywheel;

a strain gauge carried by the first caliper between the first magnet and a pivot axis of the first caliper so as to deflect in response to braking torque so as to output signals indicating braking torque.

20. The apparatus of claim 19, wherein the flywheel has a perimeter weight ring.

* * * * *